US007515615B2

(12) United States Patent
Peeters et al.

(10) Patent No.: US 7,515,615 B2
(45) Date of Patent: Apr. 7, 2009

(54) SYSTEMS AND METHODS FOR PSEUDO-RANDOM SIGNAL GENERATION IN A MULTI-CARRIER COMMUNICATIONS SYSTEM

(75) Inventors: Miguel Peeters, Woluwe-Saint-Lambert (BE); Raphael Cassiers, Braine-L'Alleud (BE)

(73) Assignee: Broadcom Corporation, Irvine, CA (US)

( * ) Notice: Subject to any disclaimer, the term of this patent is extended or adjusted under 35 U.S.C. 154(b) by 997 days.

(21) Appl. No.: 10/755,464

(22) Filed: Jan. 13, 2004

(65) Prior Publication Data

US 2004/0213331 A1    Oct. 28, 2004

Related U.S. Application Data

(60) Provisional application No. 60/440,049, filed on Jan. 15, 2003, provisional application No. 60/439,452, filed on Jan. 13, 2003.

(51) Int. Cl.
*H04J 3/06* (2006.01)
(52) U.S. Cl. ...................................................... 370/515
(58) Field of Classification Search ......... 375/130–135, 375/140, 146, 298; 380/268; 370/441; 708/250, 708/252
See application file for complete search history.

(56) References Cited

U.S. PATENT DOCUMENTS

| | | | | |
|---|---|---|---|---|
| 6,907,062 | B2* | 6/2005 | Carlson | 375/222 |
| 2001/0022810 | A1* | 9/2001 | Joo | 375/222 |
| 2001/0031017 | A1* | 10/2001 | Betts | 375/265 |
| 2001/0036274 | A1* | 11/2001 | Antoine | 380/268 |
| 2003/0012272 | A1* | 1/2003 | Carlson | 375/222 |

OTHER PUBLICATIONS

Smith, D.R., *Digital Transmission Systems, Third Edition*, Kluwer Academic Publishers, ISBN No. 1-4020-7587-1, entire book submitted (2004).
Starr, T. et al., *Understanding Digital Subscriber Line Technology*, Prentice Hall PTR, ISBN No. 0-13-780545-4, entire book submitted (1999).
*ADSL Modem*, from http://www.cdot.com/adsl.htm, 7 pages, (2003).
Chang, C.-C. et al., "Design Of A DMT-Based Baseband Transceiver For Very-High-Speed Digital Subscriber Lines," *2002 AP-ASIC Proceedings*, 4 pages (Aug. 8, 2002).
*Commercial Telecommunications Standards—T1.413 Abstract*, from http://www.comm/itsi.disa.mil/t1/413.html, 1 page (Last Updated Oct. 1, 2003).
*Technical Report TR-026: T1.413 Issue 2 ATM based ADSL ICS*, 36 pages (Sep. 9, 1999).

* cited by examiner

*Primary Examiner*—Chirag G Shah
*Assistant Examiner*—Otis L Thompson, Jr.
(74) *Attorney, Agent, or Firm*—Sterne, Kessler, Goldstein & Fox PLLC

(57) ABSTRACT

The present invention provides systems and methods for pseudo-random signal generation in a multi-carrier communications system. In embodiments, a transmitter includes a pseudo-random bit sequence (PRBS) generator and Medley signal generator. The PRBS generator can operate in at least one of the following modes: a parameter selection mode, a scrambler mode, and/or a combination mode. The Medley signal generator receives an output bit sequence from the PRBS generator. The Medley signal generator then generates a Medley signal which includes a set of Medley tones encoded based on the output bit sequence from the PRBS generator. The Medley signal is then sent over channels of a multi-carrier communication system such as an ADSL system.

19 Claims, 13 Drawing Sheets

SYSTEMS AND METHODS FOR PSEUDO-RANDOM SIGNAL GENERATION IN A MULTI-CARRIER COMMUNICATIONS SYSTEM

CROSS REFERENCE TO RELATED APPLICATIONS

This application claims the benefit of U.S. Provisional Application No. 60/440,049, filed Jan. 15, 2003 and U.S. Provisional Application No. 60/439,452, filed Jan. 13, 2003 (both of which are incorporated by reference herein in their entirety).

STATEMENT REGARDING FEDERALLY-SPONSORED RESEARCH AND DEVELOPMENT

Not applicable.

FIELD OF THE INVENTION

This invention relates to communications systems, and in particular to communications systems that use pseudo-random signals, including but not limited to, ADSL systems.

BACKGROUND OF THE INVENTION

A family of digital subscriber line technologies (xDSL) provide high-speed digital data transmission over telephone lines. Asymmetric digital subscriber line (ADSL) is one type of DSL technology. ADSL is widely used to carry information (such as voice and/or data) in a variety of residential and business customer applications.

ADSL modems are often provided at customer premises and a local exchange (such as a central office or private branch exchange). The ADSL modems are coupled to one another over a local loop. In a common implementation, an ADSL local loop is made up of a pair of wires and can simultaneously transport information on three channels: (1) a high-speed downstream digital channel towards a customer, (2) a medium speed upstream digital channel towards a local exchange, and (3) a plain old telephone service (POTS) or Integrated Services Digital Network (ISDN) channel. Because the bit rate on the downstream channel is often higher than the bit rate on the upstream channel, ADSL is termed "asymmetric."

Different standards have been used to define versions of ADSL technology. Early standards included ANSI T1.413 and ITU G.992.1. ANSI T1.413 and ITU G.992.1, among other things, require splitters at ends of a DSL local loop to separate the POTS channel and digital ADSL channels. Another version of ADSL is ADSL Lite or Universal ADSL defined by standard ITU G.992.2 or simply "G-Lite" which does not require splitters. Newer versions called ADSL2 operate at even higher bits rates and are defined by a standard ITU G.992.3 (or G.DMT.bis) which includes splitters, and standard ITU G.992.4 (or G.Lite.bis) which does not include splitters.

In certain ADSL standards, such as T1.413 issue 2 and ITU-T G.992.1/2/3/4, a pseudo random signal called Medley is used to measure the Signal-To-Noise Ratio (SNR) at the receiver on the various tones of multi-carrier systems. According to this SNR, a bit loading is done to determine the line capacity. This Medley signal can also be used to train adaptive algorithms at the receiver (e.g. equalizer) or at the transmitter (e.g. echo cancellers tap).

In all of these conventional standards, the Medley signal is generated using a pseudo-random bit sequence (PRBS), determined by a fixed polynomial and initial state that will modulate four-quadrature amplitude modulated (4QAM) symbols on each tone before modulation by an inverse discrete fast Fourier transform (IFFT). For example, the G.992.3 standard (incorporated by reference herein in its entirety) defines sequences, which are known as C-MEDLEY and R-MEDLEY. Appendix A attached hereto and incorporated by reference in its entirety herein illustrates examples of this fixed parameter approach in more detail.

Unfortunately, conventional bit sequences, for a given set of used tones or maximum number of upstream and downstream carriers (i.e., NSCus, NSCds), can produce (after IFFT processing) a high Peak-to-Average Ratio (PAR), which is the ratio between the maximum amplitude of the signal and the root-mean-square (RMS) amplitude. A high PAR can potentially lead to clipping of the signal in the digital or analog domain. This clipping usually impairs the estimation of the SNR per bin at the receiver, and the adaptation of algorithms at the receiver or transmitter. The PAR of the analog signal can be rather different from the PAR at the IFFT output because of digital and analog filtering.

What is needed are methods and systems for improved bit sequence generation in multi-carrier communication systems.

BRIEF SUMMARY OF THE INVENTION

The present invention provides systems and methods for pseudo-random signal generation in a multi-carrier communications system. In embodiments, a transmitter includes a pseudo-random bit sequence (PRBS) generator and Medley signal generator. The PRBS generator can operate in at least one of the following modes: a parameter selection mode, a scrambler mode, and/or a combination mode. The Medley signal generator receives an output bit sequence from the PRBS generator. The Medley signal generator then generates a Medley signal which includes a set of Medley tones encoded based on the output bit sequence from the PRBS generator. The Medley signal is then sent over channels of a multi-carrier communication system.

The present invention further includes methods for generating a pseudo-random bit sequence based on a parameter selection mode, scramble mode, and/or a combination mode.

In accordance with an embodiment of the parameter selection mode of the invention, the problem of a pseudo-random bit sequence (PRBS) producing a high Peak-to-Average Ratio (PAR) is alleviated by selecting, according to the number of used tones or number of upstream and downstream carriers, either a different starting state or a different polynomial of the PBRS sequence, in order to keep a reasonable PAR for a sequence of LEN_MEDLEY Medley symbols.

In accordance with an embodiment of the scramble mode of the invention, a technique is used to generate a distribution which is still nearer to a Gaussian. This requires using the PRBS as a scrambler of a periodic sequence of random bits.

In accordance with an embodiment of the combination mode of the invention, a communications system is enabled to select a method of pseudo-random signal generation to use, from amongst two or more different methods of generating a pseudo-random signal, wherein at least one of the different methods is a parameter selection mode or a scramble mode according to the present invention.

Additional objects, advantages and novel features of the invention will be set forth in part in the description that follows, and in part will become apparent to those skilled in the art upon examination of the following and the accompanying drawings, or may be learned by practice of the invention given this description.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

For a better understanding of the present invention, and to how the same may be carried into effect, reference will now be made, by way of example only, to the accompanying drawings, in which.

Figure 1:
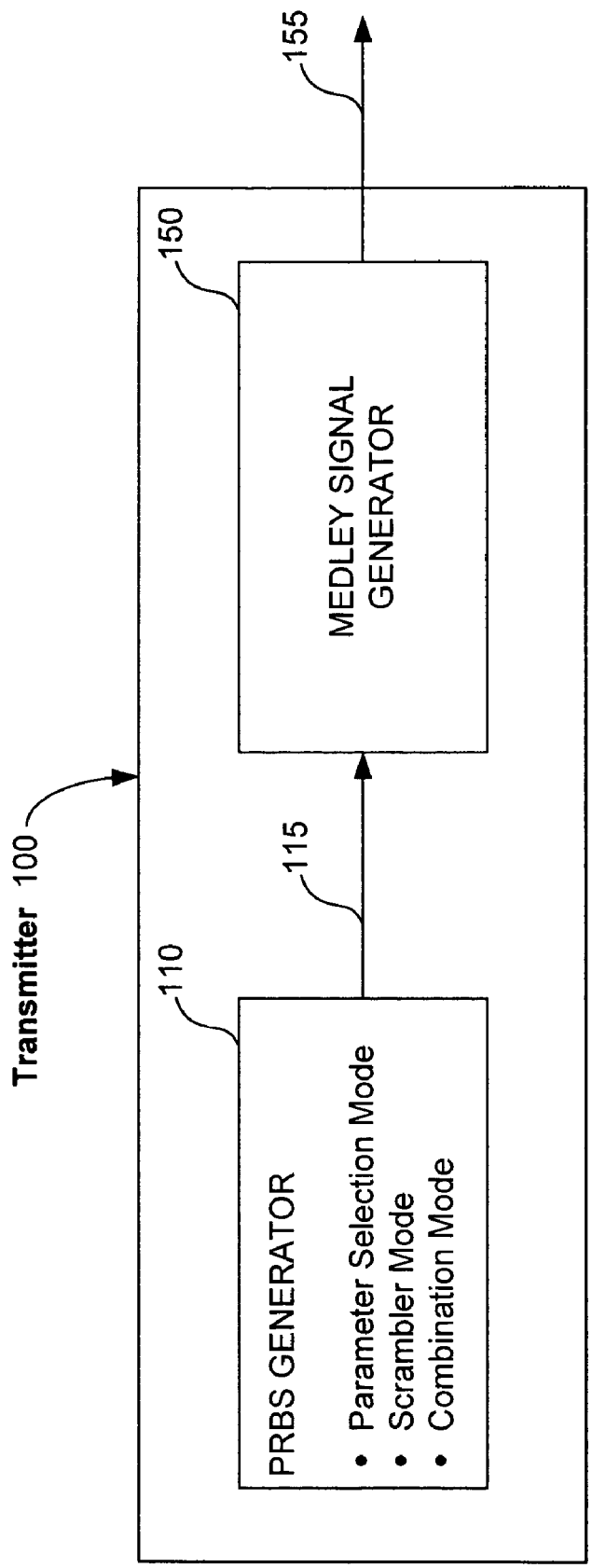
FIG. 1 is a diagram of a transmitter including a pseudo-random bit sequence (PRBS) generator according to an embodiment of the present invention.

The present invention will now be described with reference to the accompanying drawings. In the drawings, like reference numbers can indicate identical or functionally similar elements. Additionally, the left-most digit(s) of a reference number may identify the drawing in which the reference number first appears.

DETAILED DESCRIPTION OF THE INVENTION

The present invention provides systems and methods for pseudo-random signal generation in a multi-carrier communication system. Aspects of the present invention include the generation of a pseudo-random bit sequence in at least one of the following modes: a parameter selection mode, scrambler mode, and combination mode. A transmitter in an ADSL modem includes a pseudo-random bit sequence (PRBS) generator coupled to a Medley signal generator. The PRBS generator outputs an output bit sequence to the Medley signal generator. The output bit sequence is then used to seed generation of the Medley signal. The Medley signal is sent across channels of a multi-carrier communication system.

According to various embodiments of the present invention, the PRBS generator can operate in a parameter selection mode, scrambler mode, and/or combination mode. In the parameter selection mode, the PRBS generator selects parameters that define the output pseudo-random bit sequence. These parameters include, but are not limited to, the initial state of the PRBS and/or the polynomial of the PRBS. In one preferred embodiment, the PRBS generator in a parameter selection mode selects parameters (e.g., a different initial state and/or a different polynomial of a PRBS sequence) that are associated with a reasonable peak-to-average ratio (PAR) for a sequence of Medley symbols at certain ADSL modem operation characteristics such as the number of used tones or the number of upstream and downstream carriers.

In a scramble mode, a PRBS generator generates a periodic sequence of bits at a fixed initial state and/or polynomial, and then scrambles the periodic sequence to output a pseudo-random bit sequence. As a result, the amplitude distribution of the Medley sequence according to the scramble mode more closely approximates a Gaussian distribution.

In the combination mode, a PRBS generator selects a pseudo-random signal generation mode according to a parameter selection mode and/or a scramble mode. In this way, a PRBS generator can select a desired bit sequence generation mode depending on a particular desired performance goal or need.

The present invention can be used in any type of multi-carrier communication system, including but not limited to an asymmetric digital subscriber line (ADSL). The present invention can be used with any ADSL standard known now or developed in the future that requires a pseudo-random bit sequence including, but not limited to, ANSI and ITU ADSL standards.

FIG. 1 is a diagram of a transmitter 100 according to an embodiment of the present invention. Transmitter 100 includes a pseudo-random bit sequence (PRBS) generator 110 and Medley signal generator 150. PRBS generator 110 is coupled to Medley signal generator 150. PRBS generator 110 operates in one or more of the following modes: parameter selection mode, scrambler mode, and combination mode. PRBS generator 110 outputs a pseudo-random bit sequence 115 to Medley signal generator 150. Medley signal generator 150 generates a Medley signal 155 based on the received pseudo-random bit sequence 115. Medley signal 155 is then sent over a link such as an ADSL local loop across each channel in a multi-carrier communication system. The operation of PRBS generator 110 and each of the modes of operation are described further below with respect to the specific embodiments in FIGS. 3-11. Medley signal generator 150 is shown in further detail in FIG. 2.

Figure 2:
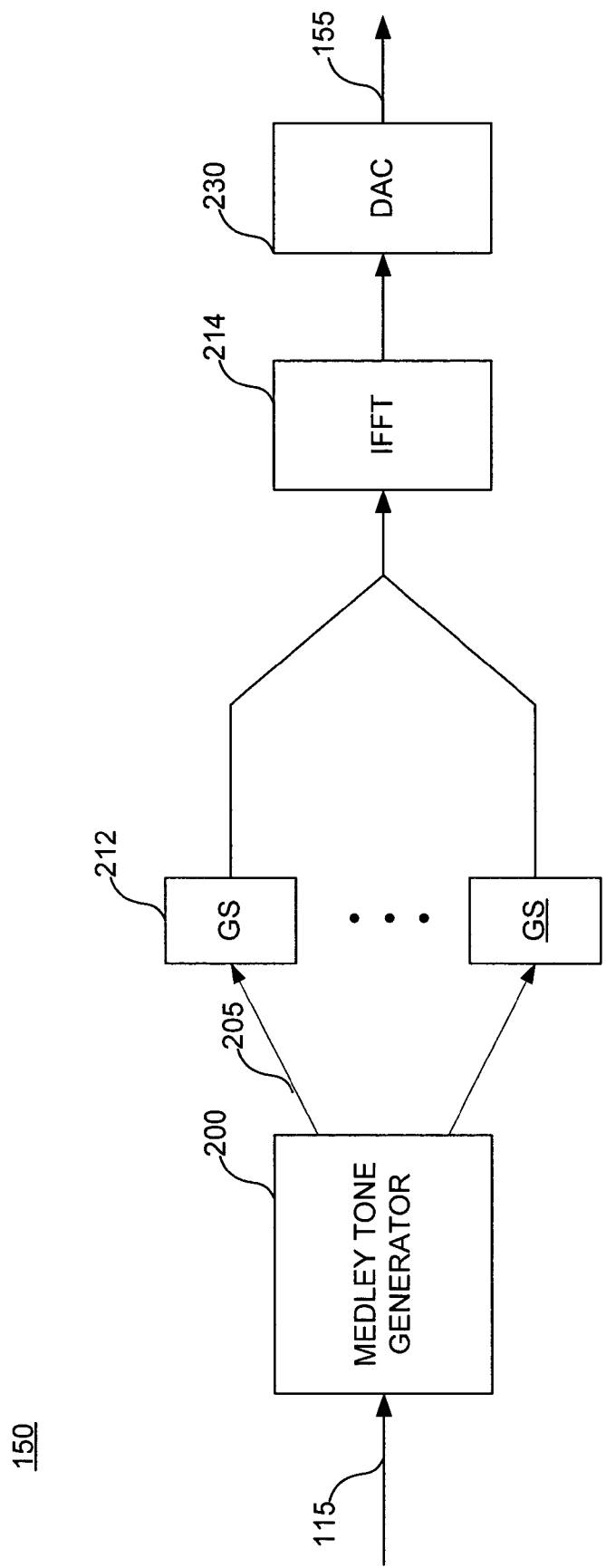
FIG. 2 is a diagram of a Medley signal generator of FIG. 1 in further detail.

As shown in FIG. 2, Medley signal generator 150 includes a Medley tone encoder 200 coupled to a number of parallel gain scaling units 212. Gain scaling units 212 are each coupled to a single inverse discrete Fourier transform (IFFT) unit 214. IFFT unit 214 is coupled to digital-to-analog converter (DAC) 230. Buffers (not shown) can also be included to buffer data prior to being sent to DAC 230.

Medley tone encoder 200 encodes a Medley symbol on each channel based on the received bit sequence 115. For example, a quadrature modulation scheme can be used, such as, a 4QAM constellation based on a two bit mapping as shown in Table 8-71 in Appendix A. In this way, a set of Medley tones are sent over channels 205. Any number of channels can be used depending on a particular multi-carrier communication system. For example, 256 channels or 512 channels can be used. A set of 256 or 512 Medley tones are then sent over respective channels 205 to parallel gain scalers 212. Gain scalers 212 scale the gain of each Medley tone. Outputs from the gain scalers 212 are fed to IFFT 214 which performs an inverse Fast Fourier transform on the scaled signals. IFFT 214 then provides a digital output to DAC 230. DAC 230 converts the digital output to an analog Medley signal 155. Medley signal 155 is then sent over a link such as an ADSL local loop to a receiver. Medley signal generator 150 is illustrative and not intended to limit the present invention which can be used with any type of Medley signal generator as would be well-known to a person skilled in the art given this description.

PRBS Generation—Parameter Selection Mode

Figure 3:
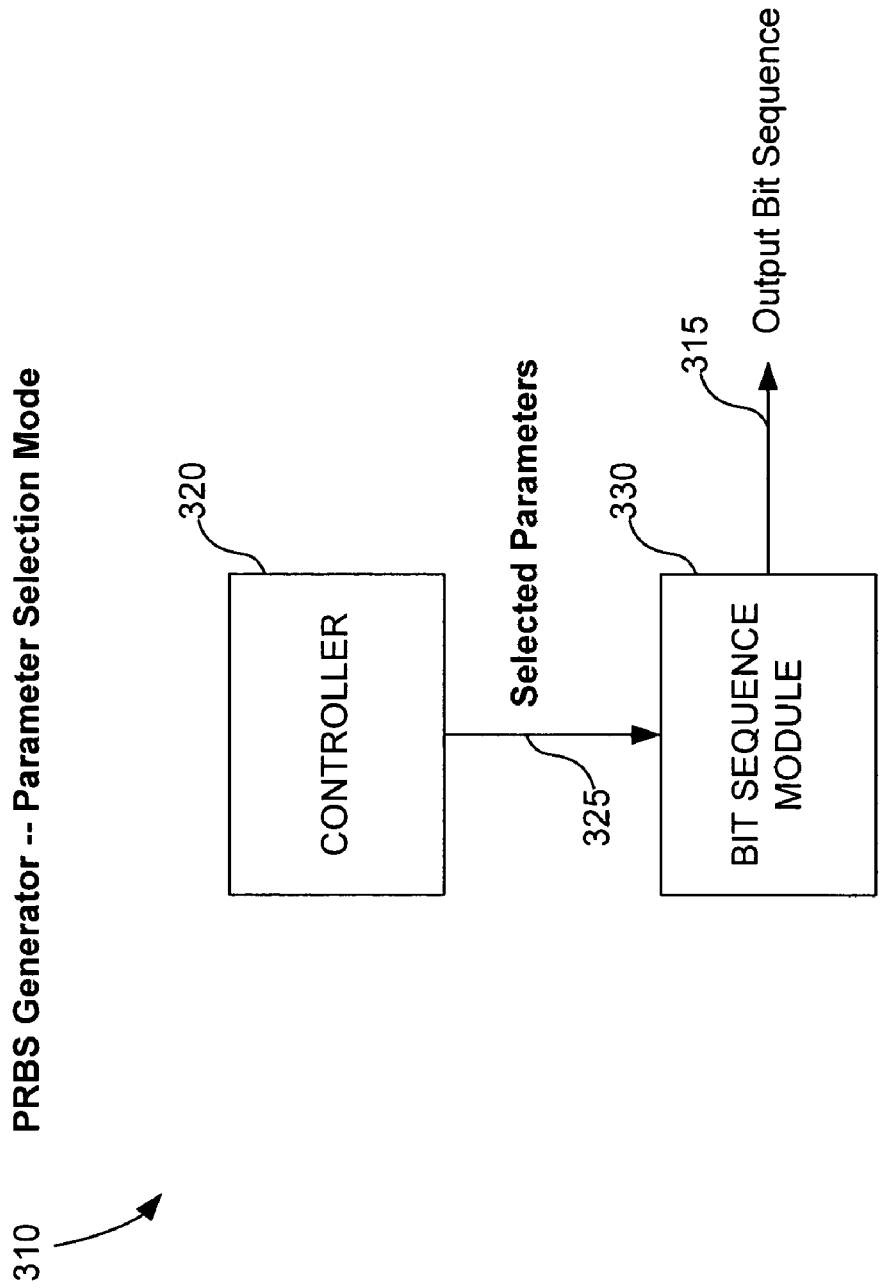
FIG. 3 is a diagram of a PRBS generator that operates in a parameter selection mode according to an embodiment of the present invention.

FIG. 3 is a diagram of a PRBS generator with Parameter Selection mode 310 according to an embodiment of the present invention. PRBS generator 310 includes a controller 320 coupled to a bit sequence module 330. Controller 320 outputs a signal 325 to bit sequence module 330. Signal 325 identifies selected parameters such as an initial state or polynomial of a PRBS. Selected parameters 325 are used to configure bit sequence module 330. Bit sequence module 330 generates an output pseudo-random bit sequence 315 based on parameters 325. In one example, the parameters 325 are selected such that a reasonable peak-to-average ratio (PAR) will be obtained on the Medley signal 155 output by Medley signal generator 150.

In accordance with an embodiment of the present invention, transmitter 100 and in particular, controller 320 selects either an initial state for the PRBS sequence (see Table One below for an example); or another polynomial (for example the polynomial of G.992.1) to generate the PRBS sequence; or both an initial state and another polynomial. Controller 320 can perform this selection automatically based on data stored in a memory (not shown) in transmitter 100. Such stored data can be a data structure having relevant data in associated fields. For example, a table can be stored that includes data in the following fields: Maximum PAR ratio for a sequence of Medley symbols, initial state, and transmit signal parameters of the ADSL modem (i.e., number of tones used; maximum number of downstream and upstream tones (e.g., NSCds, NSCus); and even characteristics of the digital and analog front end). Controller 320 can then perform a look up in the table to determine and select parameter data associated with a reasonable PAR. In addition, the present invention is not limited to automatic control, a user may also manually select parameter data, in which case controller 320 may even be omitted.

TABLE ONE

| Number of Downstream tones | Initial state | Max PAR on 8192 symbol |
|---|---|---|
| 254 | B = 0x7FFFFF | 8.4 |
| 254 | B = 0x42AEF4 | 6.27 |
| 127 | B = 0x7FFFFF | 6.83 |
| 127 | B = 0x6481EF | 6.24 |

Transmitter 100 also transmits the new initial state and/or polynomial to the receiver during a message of an initialization stage prior to the generation of the transmit MEDLEY or during the handshake protocol. The new initial state or polynomial is preferably selected in order to generate a MEDLEY signal 155 that will not be clipped by the transmitter 100 (i.e., with a reasonable PAR). It is preferable to allow flexibility at transmitter 100 in choosing the initial state or polynomial as the choice depends on various parameters of the transmit signal (i.e., number of tones used; maximum number of downstream and upstream tones (e.g., NSCds, NSCus); and characteristics of the digital and analog front end).

It is considered preferable to transmit a new initial state, rather than selecting another polynomial, at least for an ADSL modem operating according to the ITU G.992.3 standard, because transmitting a new initial state does not generally increase the complexity. In one implementation setting a new initial state can consist of programming an initial register value in bit sequence module 330 differently. The current polynomial gives a periodicity of $2^{23}-1$ bits. As a discrete multi-tone (DMT) symbol will contain a power of 2 bits, the periodicity of the MEDLEY sequence is $2^{23}/(2*NSC)*(2^{23}-1)$ symbols, (where NSC is the number of used tones (upstream and downstream)) which allows a great latitude in selecting a continuous series of Medley symbols (LEN_MEDLEY) with a good PAR to generate either the C-MEDLEY or R-MEDLEY sequence. Note that according to the G.992.3 standard, LEN_MEDLEY is less than or equal to (<=) 32256 symbols.

Figure 4:
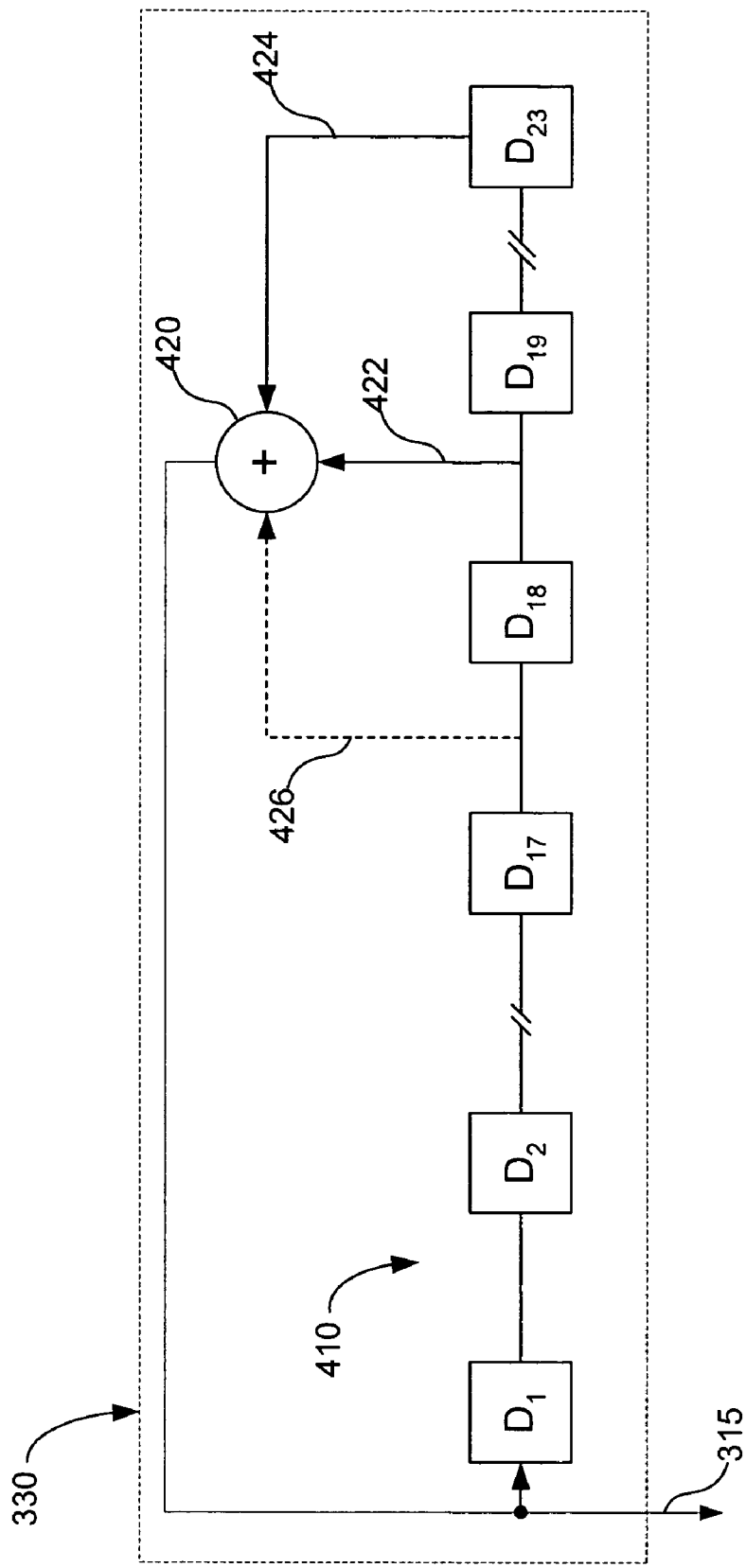
FIG. 4 is a diagram of a bit sequence module of FIG. 3 shown in further detail.

FIG. 4 is a diagram of a bit sequence module 330 according to an embodiment of the present invention. Bit sequence module 330 includes a series of unit delay elements 410 (D1-D23) and a summation element 420. At each clock cycle, each of the unit delay elements D1-D23 in series 410 shifts a respective bit. Certain bits are summed at summation unit 420. Summation unit 420 then outputs an output bit sequence 315. The initial binary values of the delay elements in series 410 and the coupling of specific bits in series 410 to summation unit 420 depends upon the selected parameter data in signal 325. An initial state and polynomial, as shown in the FIG. 4 example, may result in a configuration of delay elements D1-D23 having values set according to the initial state parameter with connections 422, 424 leading from selected delay elements D18 and D23 to summation node 420 according to the polynomial. Selected parameter 325 identifying a different initial state and/or a different polynomial may be sent from controller 320 to reconfigure bit sequence module 330. A different initial state is represented by changing the initial values of delay elements D1-D23. A different polynomial is represented by changing couplings between delay elements D1-D23 and summation node 420 or changing the number of delay elements. For example, a connection 426 can be made between delay element D17 and summation node 420.

PRBS generator 310 (including controller 320 and bit sequence module 330) can be implemented in software, firmware, hardware, or any combination thereof.

Figure 5:
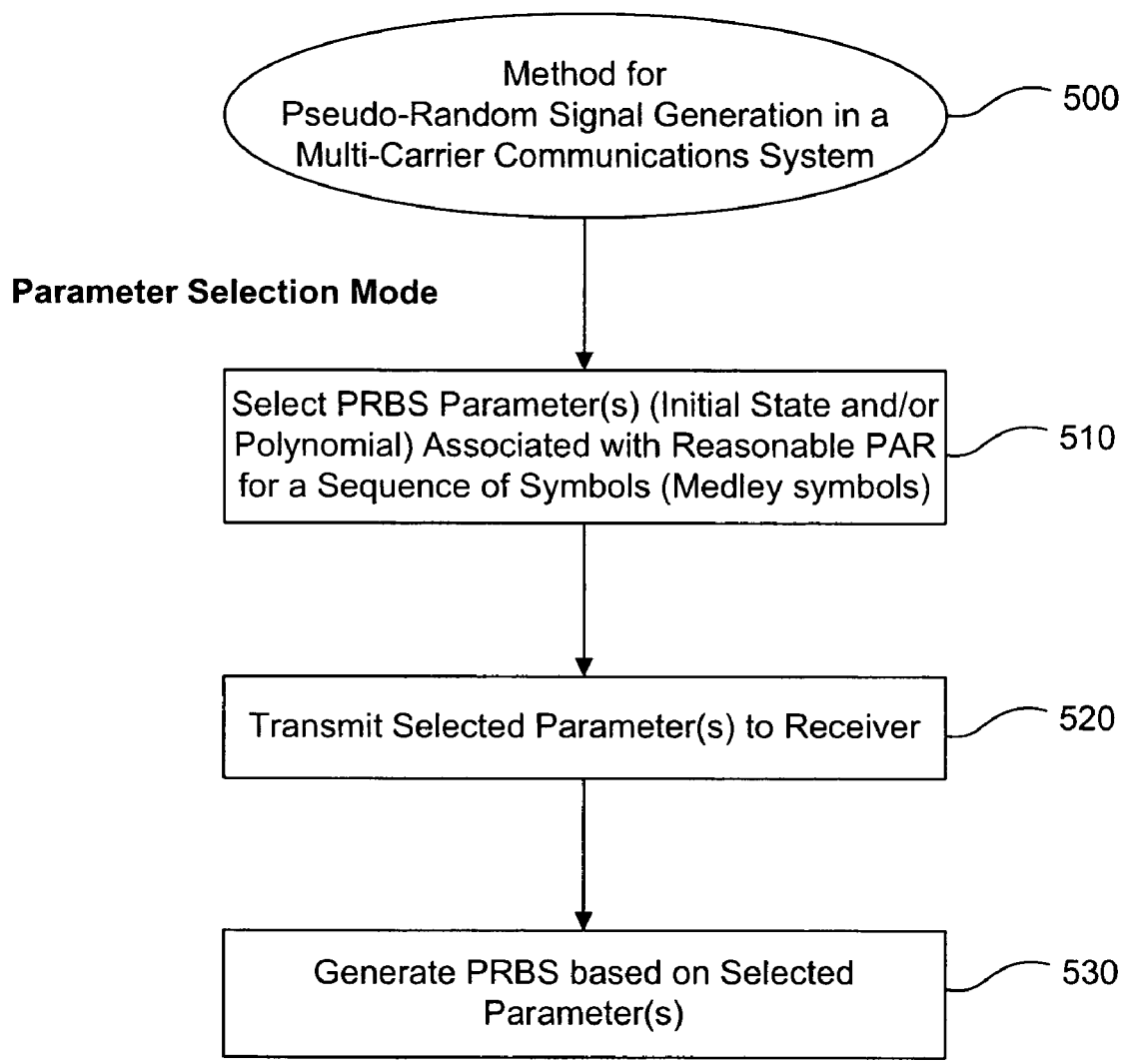
FIG. 5 is a flowchart diagram of a method for pseudo random signal generation in a multi-carrier communication system in a parameter selection mode according to an embodiment of the present invention.

FIG. 5 is a flowchart diagram of a method for pseudo-random signal generation 500 in multi-carrier communication system according to an embodiment of the present invention (steps 510-530). In step 510, PRBS parameters (such as a different initial state and/or polynomial) are selected. In one embodiment, PRBS parameters are selected such that the initial state and/or polynomial are associated with a reasonable peak-to-average ratio (PAR) for a sequence of Medley symbols based on transmit signal parameters (e.g., number of tones used, maximum number of downstream and upstream tones (e.g., NSCds, NSCus), characteristics of a digital and analog front end).

In step 520, selected parameters are transmitted to a receiver according to the receiver capabilities. In one embodiment, selected parameters are transmitted from a transmitter at a first ADSL modem to a receiver at a second ADSL modem according to the receiver capabilities.

In step 530, a PRBS is generated based on the selected parameters of step 510. For example, if a different initial state is selected, then a PRBS is generated at the different initial state. If a different polynomial is selected, then a PRBS is generated at the different polynomial. If a different initial state and a different polynomial are selected, then a PRBS is generated at the different initial state and the different polynomial. In an embodiment, steps 510-530 can be carried out by transmitter 100 including but not limited to PRBS generator 110 or PRBS generator 310.

PRBS Generation—Scramble Mode

Figure 6:
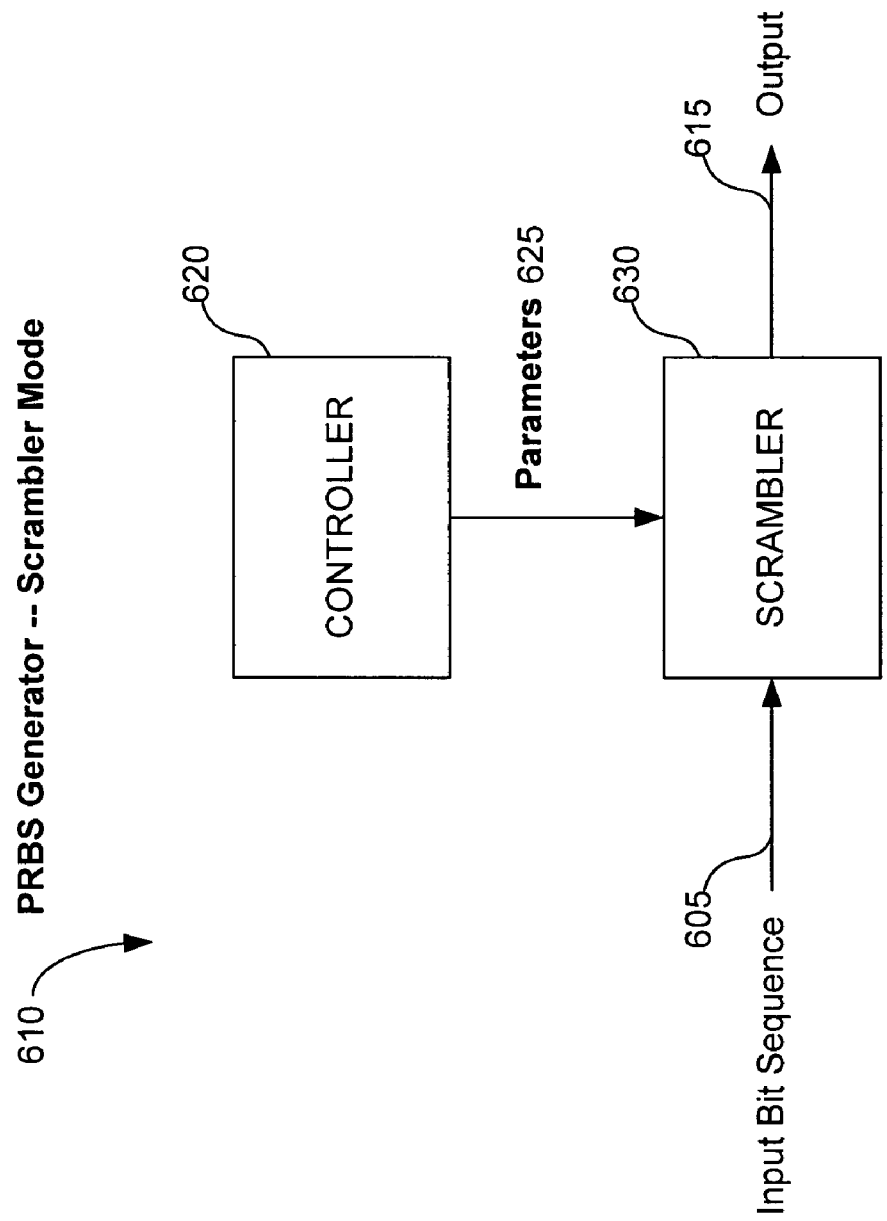
FIG. 6 is a diagram of a PRBS generator that operates in a scrambler mode according to an embodiment of the present invention.
Figure 7:
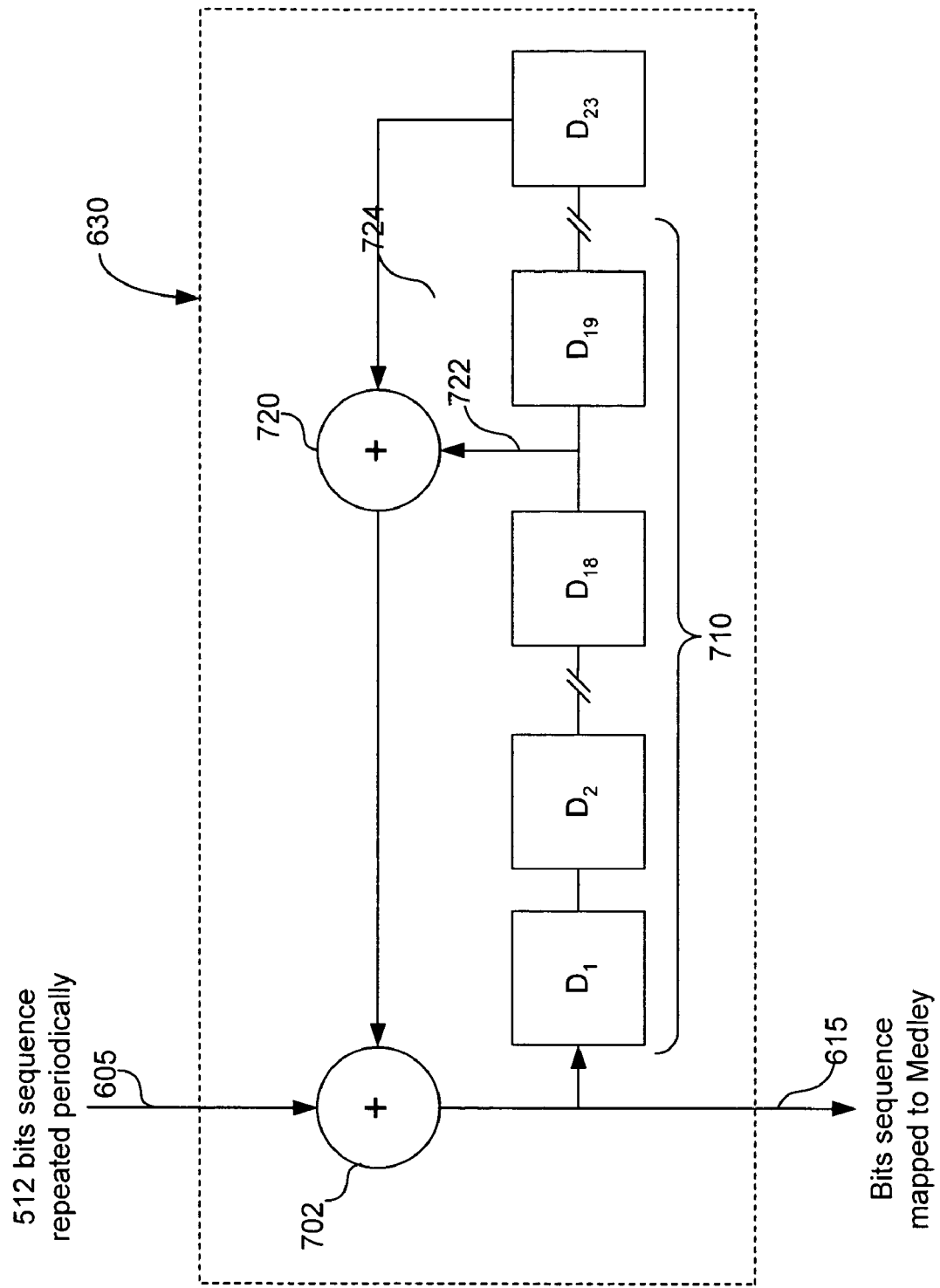
FIG. 7 is a diagram that shows a scrambler of FIG. 6 in further detail.
Figure 8:
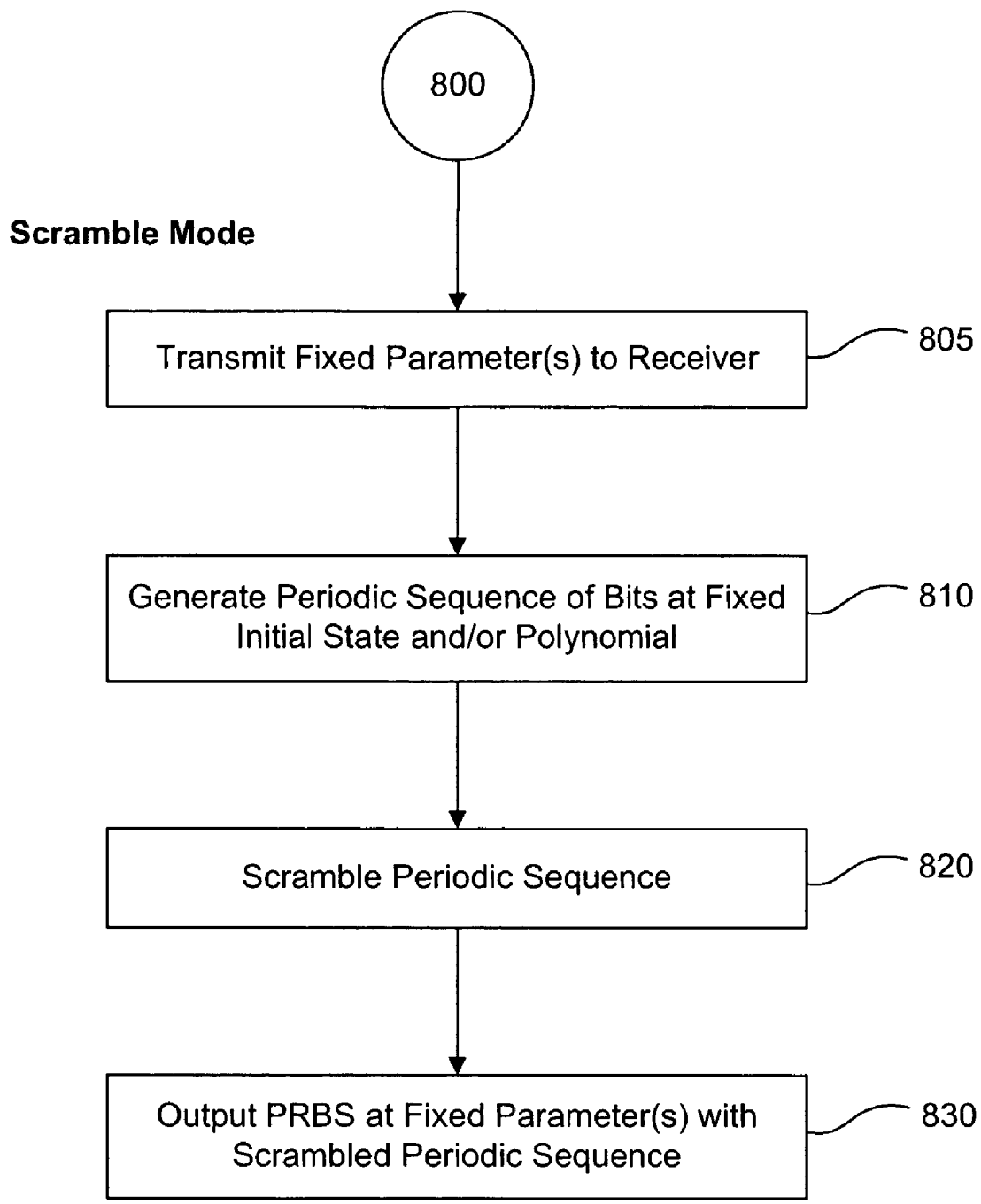
FIG. 8 is a flowchart diagram of a method for pseudo random signal generation that relates to a scramble mode according to an embodiment of the present invention.

The embodiments discussed with respect to the Parameter Selection Mode above can reduce the PAR of the Medley sequence, but do not necessarily lead to an amplitude distribution similar to a Gaussian. This is mainly due to the properties of auto-correlation of the sub-sequences of the PRBS. A solution, in accordance with another embodiment of the invention, is to scramble a periodic sequence (FIGS. 6-8). In one embodiment, a periodic sequence with a repetition of a symbol (i.e., 512 bits in downstream) is scrambled in a G.992.3 Medley scrambler (see FIG. 7).

FIG. 6 is a diagram of a PRBS generator 610 in a scrambler mode according to an embodiment of the present invention. PRBS generator 610 includes a controller 620 coupled to a scrambler 630. PRBS generator 610 (including controller 620 and scrambler 630) can be implemented in software, firmware, hardware, or any combination thereof.

Controller 620 outputs parameter(s) 625 to scrambler 630. Controller 620 is optional and can be omitted. Parameters 625 can be fixed initial state and polynomial data for configuring scrambler 630. Scrambler 630 receives a periodic input bit sequence 605, scrambles the sequence, and outputs an output bit sequence 615. One example for a 512 input bit sequence 605 is the sequence generated by the 512 bits output by a conventional G.992.1 PRBS with no initial periodic sequence or scrambling. The relatively lower PAR of a 8192 symbol attained according to this embodiment as compared to Medley generation with a conventional G.992.1 PRBS is summarized in Table Two below:

TABLE Two

| Number of Downstream tones | Initial state | Max PAR on 8192 symbol | Initial sequence |
|---|---|---|---|
| 254 | B = 0x7FFFFF | 8.4 | No periodic sequence |
| 254 | B = 0x7FFFFF | 5.1 | 512 bits periodic sequence generated from the 512 first bits outputs by G.992.1 polynomial |

FIG. 7 shows scrambler 630 in further detail. Scrambler 630 includes a series of unit delay elements 710, a first summation unit 702, and a second summation unit 720. First summation unit 702 sums the input periodic bit sequence 605 and the output from second summation unit 720. Summation unit 702 then outputs an output bit sequence 615 to the first unit delay element D1 and out to Medley signal generator 150. Series of unit delay elements 710 (D1-D23) have values set to an initial state and each shifts one bit per clock cycle. Second summation unit 720 sums outputs from selected delay elements in series 710 depending upon an initial polynomial configuration. The output from summation node 720 is fed back to first summation unit 702.

FIG. 8 is a flowchart diagram of a method 800 for generating a pseudo-random signal in a multi-carrier communication system (steps 805-830). Method 800 operates according to a scramble mode embodiment of the present invention. In step 805, fixed parameters are transmitted to a receiver. Fixed parameters can include parameters 625 (initial state and/or initial polynomial). In step 810, a periodic sequence of bits is generated. For example, a periodic sequence of bits 605 can be generated. In step 820, the periodic sequence is scrambled. For example, the periodic bit sequence 605 can be sent to a scrambler 630. In step 830, a pseudo-random bit sequence is output based on fixed parameters 625 as a scrambled periodic bit sequence 615. In an embodiment, steps 805-830 can be carried out by transmitter 100 including but not limited to PRBS generator 110 or PRBS generator 610.

Figure 9:
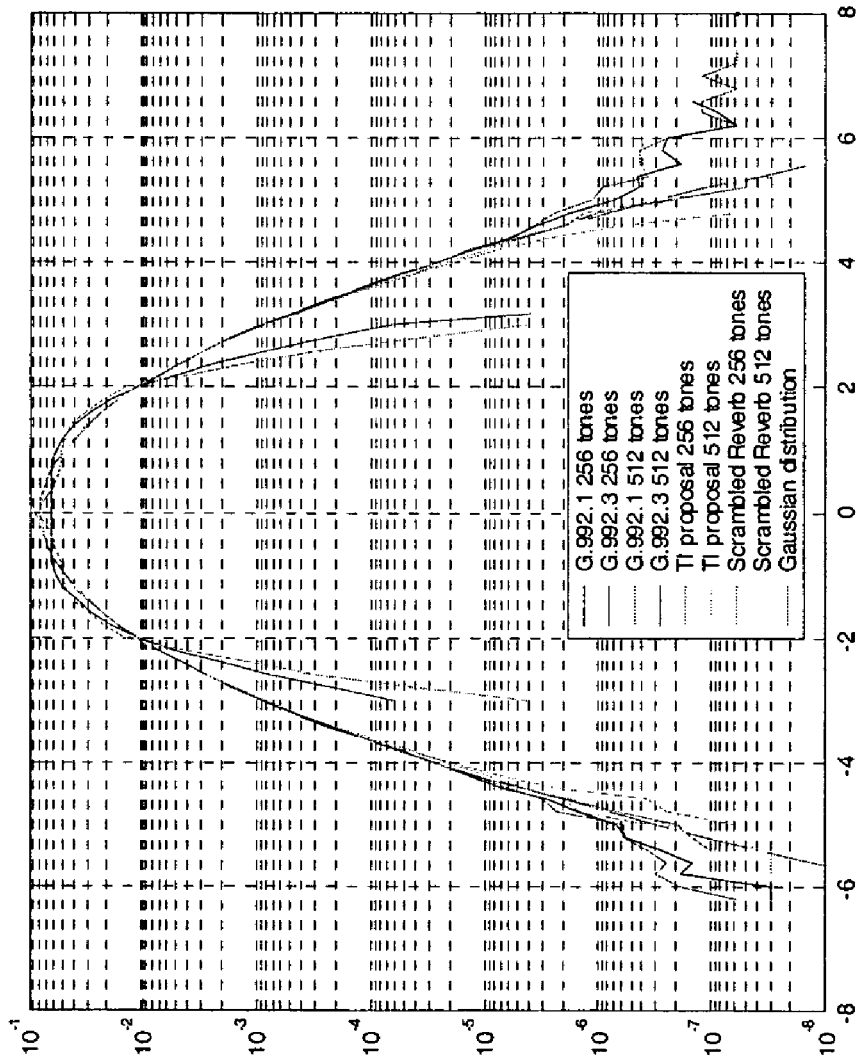
FIG. 9 is a diagram that shows an amplitude distribution of a Medley sequence as compared with the Gaussian distribution across various scrambling techniques.

FIG. 9 is a diagram that shows the distribution of various scrambling techniques compared with a Gaussian distribution. FIG. 9 shows scrambling a periodic sequence, for example with a repetition of a symbol (i.e. 512 bits in downstream), through a G.992.3 Medley scrambler, in accordance with an embodiment of the invention. FIG. 9 plots the amplitude distribution of the Medley sequence in downstream with G.992.1, G.992.3, and TI-proposal scramblers. The distribution is computed for ADSL (G.992.3, G.992.1) and ADSL+ (G.992.5), i.e., tone 2->255 used for ADSL and 2->511 for ADSL+, on a sequence of 33000 symbols. The main conclusions recognized by the inventors are the following:

the G.992.1 scrambler give a distribution that is very far from Gaussian and thus can give biased results for SNR measurements;

the G.992.3 scrambler gives a distribution with a too high PAR that can cause clipping and misestimation of the SNR; and the TI scrambler gives a distribution that is very near to Gaussian for ADSL but not for ADSL+.

One solution involves a completely different scrambler, in accordance with an embodiment of the invention (FIG. 7).

FIG. 9 shows that neither the G.992.1 or the G.992.3 scramblers gives a distribution near to a SHOWTIME distribution. This is mainly due to the properties of auto-correlation of the sub sequences of the PRBS. A solution, in accordance with an embodiment of the invention, is to scramble a periodic sequence, with a repetition of a symbol (i.e., 512 bits in downstream for ADSL and 1024 bits for ADSL+) through the G.992.3 Medley scrambler (see FIG. 7).

One preferred example for the bits sequence 605 is the sequence generated by the bits output by the G.992.1 PRBS, i.e., the bits mapped on the Reverb sequence (e.g., 512 bits for ADSL, 1024 bits for ADSL+). The PAR of this technique compared with the other current Medley generation approaches is summarized in Table Three below. The distribution compared to the other scramblers is also depicted in FIG. 9.

TABLE THREE

| Scrambler | PAR ADSL | PAR ADSL+ |
|---|---|---|
| G.992.1 | 3.20 | 3.02 |
| G.992.3 | 8.41 | 8.06 |
| TI proposal | 5.07 | 4.95 |
| Scrambled REVERB seq | 5.49 | 5.79 |

PRBS Generation—Combination Mode

In accordance with another embodiment of the invention, a communications system is enabled to select a method of pseudo-random signal generation to use, from amongst two or more different methods of generating a pseudo-random signal, where at least one of the different methods is a method according to an embodiment of the invention. For example, a system may be enabled to choose between using the pseudo-random signal generation used in the current G.992.3 Medley signal, and using the pseudo-random signal generation discussed in the embodiment above (that uses scrambling of a periodic sequence). An embodiment enabling such a choice may be useful, for example, to provide an alternative choice of pseudorandom signal generation for a communications system that would encounter difficulties in using the technique of scrambling a periodic sequence.

Figure 10:
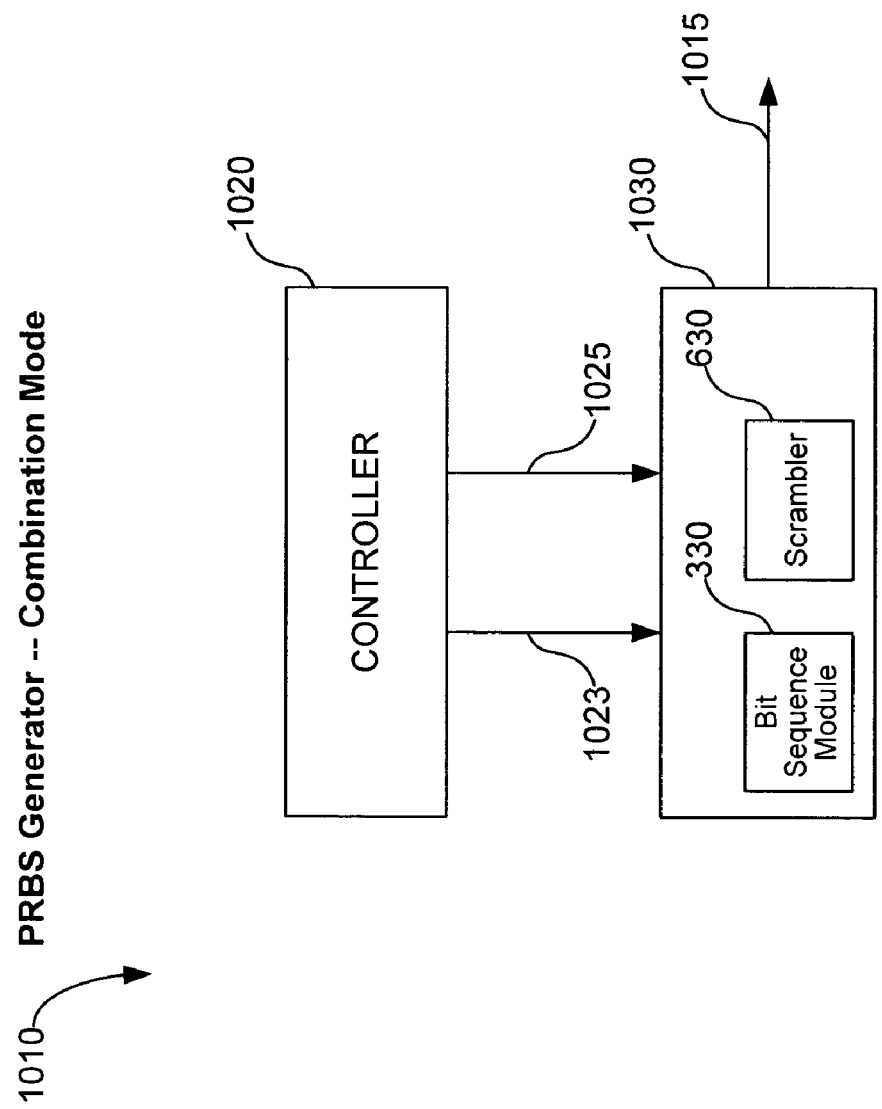
FIG. 10 is a diagram of a PRBS generator that operates in a combination mode according to an embodiment of the present invention.

FIG. 10 is a diagram of a PRBS generator in a combination mode 1010 according to an embodiment of the present invention. PRBS generator 1010 includes a controller 1020 coupled to a bit processor 1030. Bit processor 1030 includes bit sequence module 330 and scrambler 630. Bit processor 1030 outputs an output bit sequence 1015. The operation performed by bit processor 1030 depends upon control and parameter information sent by controller 1020. For example, controller 1020 outputs a selector signal 1023 that selects whether bit sequence module 330 or scrambler 630 is activated. Controller 1025 also outputs parameter information 1025 to configure bit processor 1030. This parameter information can include initial state and/or polynomial information for configuring summation units and unit delay elements in bit sequence module 330 and/or scrambler 630. Once selected, bit sequence module 330 and scrambler 630 operate as described above.

PRBS generator 1010 (including controller 1020 and bit processor 1030) can be implemented in software, firmware, hardware, or any combination thereof.

Figure 11:
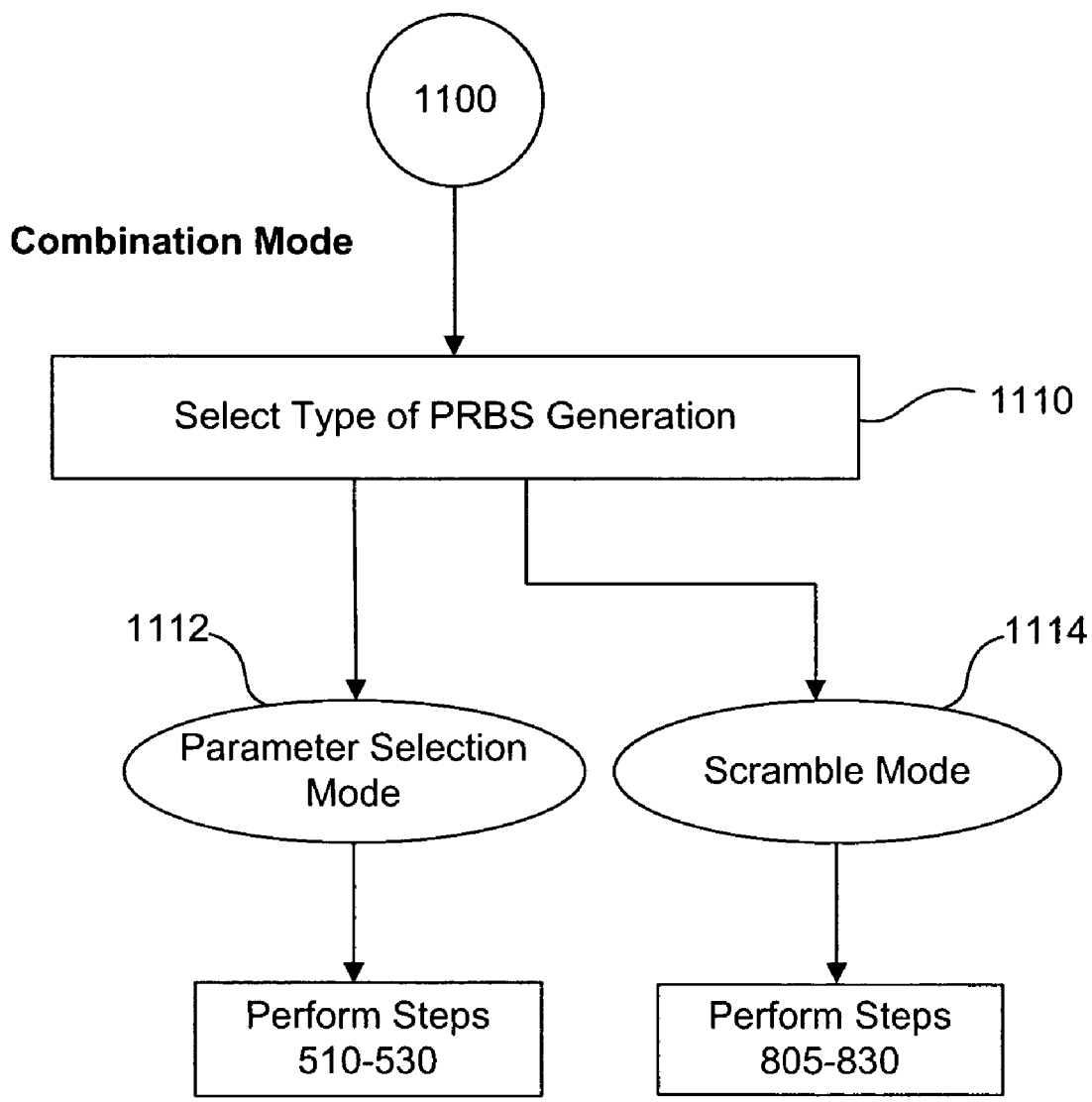
FIG. 11 is a flowchart diagram of a method for pseudo random signal generation according to a combination mode in an embodiment of the present invention.

FIG. 11 is a flowchart diagram of a method 1100 for generating a pseudo-random signal according to a combination mode embodiment of the present invention (steps 1100-1114). In step 1110, the type of pseudo-random bit sequence (PRBS) generation is selected. This type can include a parameter selection mode or a scramble mode and can be selected automatically by controller 1020 or manually by a user as desired. If parameter selection mode (1112) is selected, then control proceeds to perform steps 510-530 as described above. If scramble mode 1114 is selected, then control proceeds to perform steps 805-830 as described above. In an embodiment, steps 1110-1114 can be carried out by transmitter 100 including but not limited to PRBS generator 110 or PRBS generator 1010.

Example Environment

The present invention can be used in any type of multi-carrier communication system, including but not limited to ADSL systems defined according to any standard. Example standards include, but are not limited to, ANSI and/or ITU standards.

Figure 12:
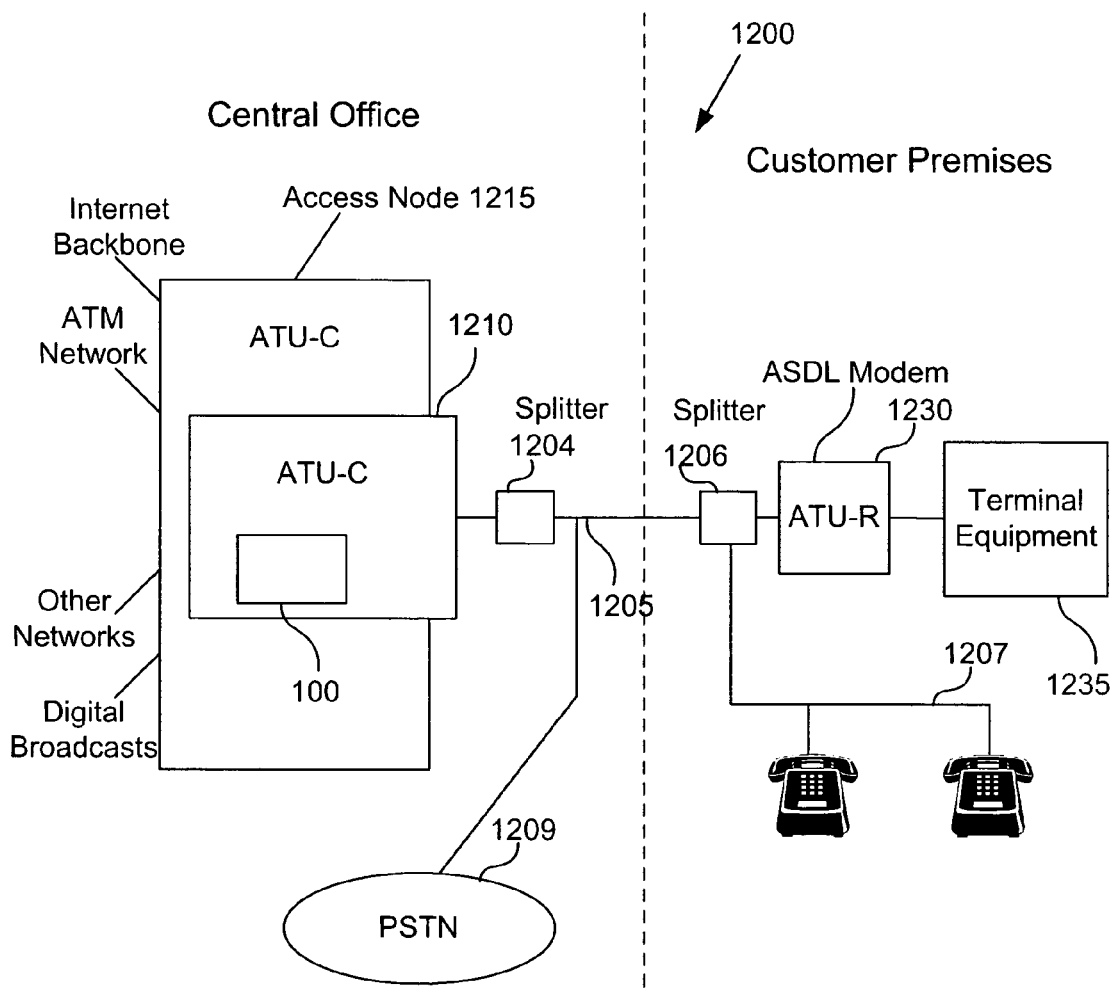
FIG. 12 is a diagram of an ADSL communication system having splitters according to an embodiment of the present invention.

FIG. 12 is a diagram of an ADSL communication system 1200 according to an embodiment of the present invention. ADSL system 1200 provides high-speed voice and/or data communication between the central office and a customer premises. A central office has an ADSL modem 1210 coupled over a local loop 1205 to an ADSL modem 1230 at the customer premises. According to the present invention, ADSL modem 1210 further includes a transmitter 100 as described above with respect to the present invention. Transmitter 100 can also be included in the ADSL modem 1230. In one example, splitters 1204 and 1206 are provided between ADSL modems 1210 and 1230. Splitters 1204 and 1206 are used to split low-frequency traffic such as analog voice to a public switch telephone network (PSTN) 1209 and telephones 1207. For example, low-pass filters are often used in splitters 1204, 1206. ADSL modem 1210 is coupled to an access node 1215 at the central office. Access node 1215 can be coupled to any network, including but not limited to a broadband network. In the example of FIG. 12, access node 1215 is coupled to an Internet backbone, asynchronous transfer mode (ATM) network, other networks, and/or digital broadcasters.

ADSL modem 1230 is coupled to terminal equipment 1235. Terminal equipment 1235 can include any type of terminal equipment that supports ADSL communication, including but not limited to a computer, internet telephone, set-top box, television, or other electronic device.

Figure 13:
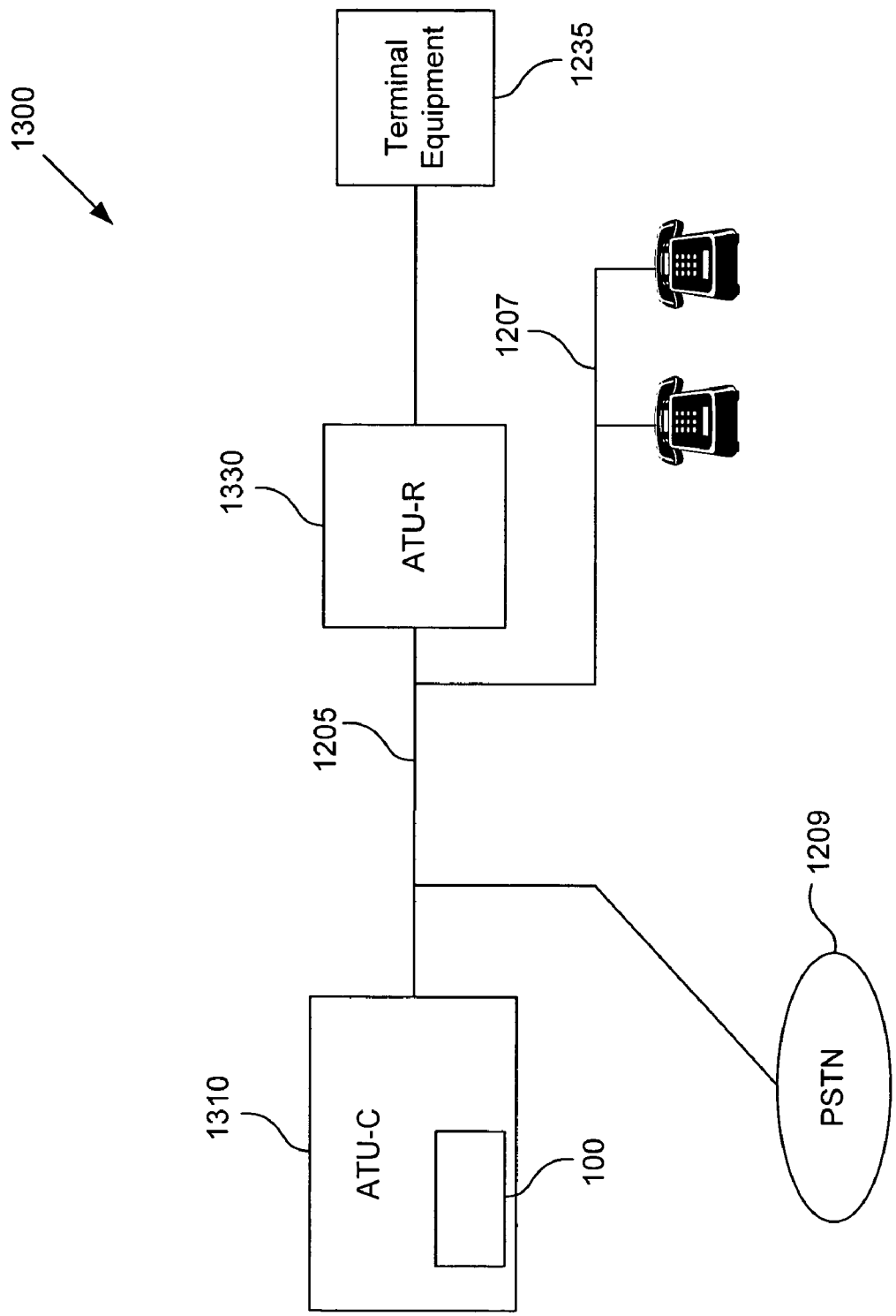
FIG. 13 is a diagram of an ADSL communication system without splitters according to an embodiment of the present invention.

FIG. 13 is a diagram of an ADSL communication system 1300 according to a further embodiment of the present invention. ADSL communication system 1300 includes ADSL modems 1310 and 1330. ADSL modems 1310-1330 are coupled over DSL local loop 1205. In the example of FIG. 13, splitters are omitted. Such splitters are not necessary in certain ADSL standards such as G-lite, as is well known to those skilled in the art relevant to the present invention. In one example, ADSL modem 1310 include a transmitter 100 according to embodiments of the present invention. ADSL modem 1330 can also include a transmitter 100.

Currently there are a number of proposals for Extending the Japanese version of ADSL, known as ANNEX_C. The extensions put forward are Annexes I and J. The invention could additionally apply in communications apparatus or protocols according to any such standards or future equivalents. Furthermore, there is proposed a new Annex A standard, known as G.992.3 (ADSL2) from the ITU, and various proposals for an Annex C version of this standard to which embodiments could apply. It is therefore noted that the benefits outlined herein may be incorporated in current and future standards.

A skilled reader will appreciate that, while the foregoing has described what is considered to be the best mode and, where appropriate, other modes of performing the invention, the invention should not be limited to specific apparatus configurations or method steps disclosed in this description of the preferred embodiments. Those skilled in the art will also recognize given this description that the invention has a broad range of applications, not necessarily connected with ADSL or even DSL communications systems, and the embodiments admit of a wide range of modifications without departing from the inventive concepts.

While various embodiments of the present invention have been described above, it should be understood that they have been presented by way of example only, and not limitation. It will be understood by those skilled in the art that various changes in form and details can be made therein without departing from the spirit and scope of the invention as defined in the appended claims. Thus, the breadth and scope of the present invention should not be limited by any of the above-described exemplary embodiments, but should be defined only in accordance with the following claims and their equivalents.

Appendix A—ITU G. 992.3 Standard—Excerpts

This appendix illustrates examples of the conventional fixed parameter approach in more detail. Excerpts of the G.992.3 standard defining sequences, which are known as C-MEDLEY and R-MEDLEY, are provided as follows:

"The C-MEDELEY state is fixed length. In this state, the ATU-C shall transmit LEN-MEDLEY symbols. The value LEN-MEDLEY shall be the maximum of the CA-MEDLEYus and CA-MEDLEYds values indicated by the ATU-C and the ATU-R in the C-MSG1 messages respectively. The value LEN-MEDLEY shall be a multiple of 512 and shall be less than or equal to 32256. The number of symbols transmitted in the C-MEDLEY state shall be equal to the number of symbols transmitted by the ATU-R in the R-MEDLEY state.

A C-MEDLEY symbol shall be defined depending on its symbolcount within the C-MEDLEY state. The first symbol transmitted in the C-MEDLEY state shall have symbolcount equal to zero. For each symbol transmitted in the C-MEDLEY state, the symbolcount shall be incremented.

The data pattern modulated onto each C-MEDLEY symbol shall be taken from the pseudo-random binary sequence (PRBS) defined by:

$$d_n=1 \text{ for } n=1 \text{ to } 23 \text{ and } d_n=d_{n-18} \oplus d_{n-23} \text{ for } n>23.$$

The C-MEDLEY symbol with symbolcount I shall modulate the 512 bits $d_{512*i+1}$ to $d_{512*(i+1)}$.

Bits shall be extracted from the PRBS in pairs. For each symbol transmitted in the C-MEDLEY state, 256 pairs (512 bits) shall be extracted from the PRBS generator. The first extracted pair shall be modulated onto sub-carrier 0 (so the bits are effectively ignored). The subsequent pairs are used to define the Xi and Yi components for the sub-carriers i=1 to NSCds−1, as defined in Table 8-71 for C-REVERB symbols. For the subcarriers i=NSCds to 2*NSCds−1, the Xi=Yi=0.

Note that 256 bit pairs per symbol are extracted from the PRBS. If NSCds is less than 256 (as in G.992.4), then the last (256−NSCds) bit pairs are effectively ignored.

The R-MEDLEY state is of fixed length. In this state, the ATU-R shall transmit LEN-MEDLEY symbols. The value LEN-MEDLEY shall be the maximum of the CA-MEDLEYus and CA-MEDLEYds values indicated by the ATU-C and the ATU-R in the C-MSG1 and R-MSG1 messages respectively. The value LEN-MEDLEY shall be a multiple of 512 and shall be less than or equal to 32256. The number of symbols transmitted in the R-MEDLEY state shall be equal to the number of symbols transmitted by the ATU-C in the C-MEDLEY state.

An R-MEDLEY symbol shall be defined depending on its symbolcount within the R-MEDLEY state. The first symbol transmitted in the R-MEDLEY state shall have symbolcount equal to zero. For each symbol transmitted in the R-MEDLEY state, the symbolcount shall be incremented.

The data pattern modulated onto each R-MEDLEY symbol shall be taken from the pseudo-random binary sequence (PRBS) defined by:

$$d_n=1 \text{ for } n=1 \text{ to } 23 \text{ and } d_n=d_{n-18} \oplus d_{n-23} \text{ for } n>23.$$

The R-MEDLEY symbol with symbolcount i shall modulate the bits $d_{2*NSCus*i+1}$ to $d_{2*NSCus*(i+1)}$. The value of NSC (the number of upstream sub-carriers) is defined in the Annexes. Bits shall be extracted from the PRBS in pairs. For each symbol transmitted in the R-MEDLEY state, NSCus pairs (2*NSCus bits) shall be extracted from the PRBS generator. The first extracted pair shall be modulated onto sub-carrier 0 (so the bits are effectively ignored). The subsequent pairs are used to define the Xi and Yi components for the sub-carriers i=1 to NSCus−1, as defined in Table 8-71 for C-REVERB symbols. For the subcarriers i=NSCus to 2*NSCus−1, Xi=0 and Yi=0."

TABLE 8-71

| G.992.3 - Mapping of two data bits into a 4QAM constellation | | |
|---|---|---|
| $d_{2i+1}$ | $d_{2i+2}$ | $X_i Y_i$ |
| 0 | 0 | ++ |
| 0 | 1 | +− |
| 1 | 0 | −+ |
| 1 | 1 | −− |

What is claimed is:

1. A transmitter for an asymmetric digital subscriber line (ADSL) modem configured to be coupled to a receiver over a local loop, comprising:
    a pseudo-random bit sequence generator that outputs an output pseudo-random bit sequence (PRBS); and
    a Medley signal generator that receives the output PRBS and generates a Medley signal based on the output PRBS;
    wherein said pseudo-random bit sequence generator operates in a parameter selection mode, and includes a controller coupled to a bit sequence module; said controller passing selected parameter data to said bit sequence module, and said selected parameter data including at least one of a selected initial state and selected polynomial that defines processing of bits in said bit sequence module to generate the output pseudo-random bit sequence,
    and wherein said bit sequence module includes a series of unit delay elements having values, and the values are set based on selected initial state parameter data.

2. The transmitter of claim 1, wherein the ADSL modem includes multiple channels, and said Medley signal generator includes a Medley tone encoder that modulates four-quadrature amplitude modulated (4QAM) symbols based on the received output PRBS to generate a set of tones for the multiple channels.

3. The transmitter of claim 1, wherein said bit sequence module includes a summation unit, and
    wherein outputs of at least two of said unit delay elements are coupled to said summation unit according to a selected polynomial, and said summation unit sums the coupled outputs to obtain the output pseudo-random bit sequence.

4. The transmitter of claim 1, wherein said controller selects said selected parameter data based on an association with a reasonable peak-to-average (PAR) ratio for a sequence of Medley symbols.

5. The transmitter of claim 1, further comprising a memory that stores a table that includes data in associated fields, said fields including Maximum PAR ratio for a sequence of Medley symbols, initial state, and transmit signal parameters of the ADSL modem.

6. The transmitter of claim 1, wherein said transmitter transmits selected parameter data to the receiver.

7. A method, comprising:
    selecting parameter data based on an association of the selected parameter data with a reasonable peak-to-average (PAR) ratio for a sequence of Medley symbols, wherein the reasonable PAR is determined from data relating a PAR with at least one of a number of used tones and a number of upstream and downstream carriers of an ADSL modem;
    transmitting the selected parameter data to a receiver; and generating a pseudo-random bit sequence based on the selected parameter data; whereby the pseudo-random bit sequence is output to seed generation of a Medley signal in the ADSL modem.

8. The method of claim 7, wherein said selected parameter data comprises at least one of a selected initial state or a selected polynomial.

9. A transmitter for an asymmetric digital subscriber line (ADSL) modem configured to be coupled to a receiver over a local loop, comprising:
   a pseudo-random bit sequence generator that outputs an output pseudo-random bit sequence (PRBS); and
   a Medley signal generator that receives the output PRBS and generates a Medley signal based on the output PRBS;
   wherein said pseudo-random bit sequence generator has three modes including a parameter selection mode, a scramble mode, and a combination mode, and wherein said pseudo-random bit sequence generator is configured to operate at a given time in any one of the three modes.

10. The transmitter of claim 9, wherein the ADSL modem includes multiple channels, and said Medley signal generator includes a Medley tone encoder that modulates four-quadrature amplitude modulated (4QAM) symbols based on the received output PRBS to generate a set of tones for the multiple channels.

11. The transmitter of claim 9, wherein said pseudo-random bit sequence generator operates in the scramble mode, and includes a scrambler that receives an input periodic bit sequence and scrambles the input periodic bit sequence to obtain the output pseudo-random bit sequence.

12. The transmitter of claim 11, wherein said scrambler comprises an ITU G.992.3 Medley scrambler.

13. The transmitter of claim 11, wherein said input periodic bit sequence comprises bits output by an ITU G.992.1 PRBS generator.

14. The transmitter of claim 11, wherein said scrambler comprises a series of unit delay elements having values according to an initial state and first and second summation units, wherein outputs of at least two of said unit delay elements are coupled to said second summation unit according to an initial polynomial, and said second summation unit sums the coupled outputs and outputs a first sum signal to said first summation unit which performs a sum of the first sum and the input periodic bit sequence to obtain the output pseudo-random bit sequence.

15. The transmitter of claim 9, wherein said pseudo-random bit sequence generator operates in the combination mode, and includes a controller coupled to a bit sequence module and a scrambler; wherein said controller selects either of the bit sequence module and the scrambler.

16. A transmitter for an asymmetric digital subscriber line (ADSL) modem configured to be coupled to a receiver over a local loop, comprising:
   a pseudo-random bit sequence generator that outputs an output pseudo-random bit sequence (PRBS); and
   a Medley signal generator that receives the output PRBS and generates a Medley signal based on the output PRBS;
   wherein said pseudo-random bit sequence generator operates in a scramble mode, and includes a scrambler that receives an input periodic bit sequence and scrambles the input periodic bit sequence to obtain the output pseudo-random bit sequence, wherein said scrambler comprises an ITU G.992.3 Medley scrambler.

17. The transmitter of claim 16, wherein said input periodic bit sequence comprises bits output by an ITU G.992.1 PRBS generator.

18. A transmitter for an asymmetric digital subscriber line (ADSL) modem configured to be coupled to a receiver over a local ioop, comprising:
   a pseudo-random bit sequence generator that outputs an output pseudo-random bit sequence (PRBS); and
   a Medley signal generator that receives the output PRBS and generates a Medley signal based on the output PRBS;
   wherein said pseudo-random bit sequence generator operates in a scramble mode, and includes a scrambler that receives an input periodic bit sequence and scrambles the input periodic bit sequence to obtain the output pseudo-random bit sequence, wherein said scrambler comprises a series of unit delay elements having values according to an initial state and first and second summation units, wherein outputs of at least two of said unit delay elements are coupled to said second summation unit according to an initial polynomial, and said second summation unit sums the coupled outputs and outputs a first sum signal to said first summation unit which performs a sum of the first sum and the input periodic bit sequence to obtain the output pseudo-random bit sequence.

19. The transmitter of claim 18, wherein said input periodic bit sequence comprises bits output by an ITU G.992.1 PRBS generator.

* * * * *